3,309,321
WINDSHIELD CLEANER
Wardley D. McMaster, Southfield, Mich., assignor to General Motors Corporation, Detroit, Mich., a corporation of Delaware
No Drawing. Filed May 14, 1964, Ser. No. 367,569
9 Claims. (Cl. 252—152)

This invention relates to a glass-cleaning composition having particular utility for cleaning automobile windshields or the like whereby the distorted vision due to the non-wettability of adsorbed contaminants on windshields is efficiently eliminated. The cleaning composition is particularly adapted for use in automobile windshield washers wherein the cleaning is accomplished by the action of windshield wiper blades.

The obvious foreign matter such as dust, road salt, and the like, frequently accumulated on windshields presents no particular cleaning problem because it is easily removed by water and the wiping action of the wiper blades. However, it is well known to those who operate automobiles that a scum or film can form on automobile windshields under typical atmospheric or automobile operating conditions which will obscure the vision and that this scum is extremely difficult to remove by means of ordinary water or the typical surfactant-containing washing solutions. The wiping action of the windshield wiper tends to produce a smeared surface or what is known as a "lace-curtain" effect on the windshield which may seriously obscure vision. This scum or film is due to other contaminants, which usually are organic in nature, and are difficult to remove. When the windshield is dry, these contaminants are often invisible. A common source of such contamination is the wiper blade itself which may cause a film of its plasticizer, such as dibutyl phthalate, to deposit on the windshield. Another source is wiping rags that may leave a film of oil or wax on the surface when they are used to wipe the windshield. Probably a more common source of such materials is the atmosphere of urban communities which tends to deposit its contaminants consisting of hydrocarbons, tars, soots, etc. on the windshield.

The surface of glass, which has a relatively high surface energy, is physically altered by the adsorption of non-polar or semi-polar compounds such as hydrocarbons, tars, esters, and the like. Substances of this nature are characteristic of polluted atmospheres and form adsorbed films with low surface energies on automobile windshields. The films are troublesome because they interfere with the wetting process to the extent that vision through a wet windshield is distorted by a water layer that quickly breaks at the trailing edge of the wiper blade into a vision distorting discontinuous film. This phenomenon is called the "lace-curtain" effect because the broken film of liquid presents a lacy appearance. The critical surface tension of the adsorbed film is so low that only in rare instances is it possible to reduce the surface tension of water sufficiently for wetting to occur. This effect can be counteracted only by removing the low-energy contaminating film and thus permitting the water to wet the high-energy surface of the glass and form a continuous liquid film. This is best accomplished by dissolution of the contaminants or by displacing them with water-soluble chemicals with a stronger affinity for the surface than is possessed by the contaminants themselves, plus, of course, the wiping action of the blades. This accounts for the general inadequacy of typical windshield cleaners in which a surfactant or wetting agent is intended to function as the active cleaning constituent. Surfactants alone do not accomplish the removal.

Glass is a supercooled liquid or amorphous solid produced from inorganic oxides, the major constituent being $SiO_2$ (silica or sand). Other oxides are incorporated into the melt to modify the physical properties of the glass. Automobile windshield plate glass usually has the following approximate chemical composition: silicon dioxide 71 to 73%; sodium oxide 12 to 14%; calcium oxide 10 to 12%; magnesium oxide 1 to 4%; aluminum oxide 0.5 to 1.5%; and about 1% ferric oxide. The sodium oxide, which acts as a fluxing agent, is incorporated in the glass melt to increase the ratio of oxygen to silicon in the network. These "extra" oxygen atoms cannot be taken into the structure of the silica and consequently the network loses its continuity and a highly random glassy state results. Furthermore the sodium oxide greatly reduces the viscosity of silica and results in lower melting temperatures which improves the firing qualities of the glass. The sodium ions, which are relatively small, are quite mobile and are able to pass readily from one space to another within the non-crystalline network even at room temperatures. The other oxide modifiers such as the magnesium oxide, calcium oxide and aluminum oxide are added to the glass to increase its chemical durability.

It is known that acids have a different effect on glass than do bases. Acids attack the basic sites in the glass (basic oxides) leaving holes within the network structure. Alkaline solutions, on the other hand, not only attack the modifying oxides but also tend to disperse the silica. Accordingly the etching effect of alkaline solutions must be carefully considered in the development of a windshield cleaning composition. Moreover, since the cleaning solution will normally contact painted and metal surfaces, the cleaning composition must be substantially inert with respect to such surfaces.

It is the basic object of this invention to provide an automobile windshield cleaning solution adapted for use in conventional automobile windshield washers which will not significantly attack the glass, is operative to remove all the contaminants usually associated with automotive windshields, and will not significantly attack or otherwise adversely affect the metal and painted portions of an automobile body. It is a further object of this invention to provide a liquid windshield washing composition adapted for use in conventional automobile windshield washing apparatus. Another object is to provide a windshield washing composition which may be formulated in a compact, concentrated form for addition to water or water plus alcohol solutions for use in windshield washing apparatus. Yet another object of the invention is to provide a windshield washing solution which will remove not only windshield contaminants such as dust, road salt and the like, but also the difficult-to-remove contaminants such as organic plasticizers, oil, wax and various contaminants such as hydrocarbons, soots, tars, etc. deposited on the windshield from the atmosphere, by means of the usual hand wiping action or by means of windshield wiper apparatus. The various ingredients in the windshield washing solution of this invention are carefully selected to fulfill the aforementioned objects.

These and other objects are accomplished by providing an aqueous composition containing the essential ingredients of an amine taken from the group consisting of monoethanolamine, diethanolamine, diethylenetriamine, ethylenediamine and isobutylamine; sodium mercaptobenzothiazole; a wetting agent; and preferably a sequestering agent taken from the group consisting of trisodium nitrilotriacetate and the tetrasodium salt of ethylenediaminetetraacetic acid. The mixture or solution in suitable proportions is dissolved in a quantity of water or water and a freezing temperature depressant (alcohol) which, as will hereinafter appear, is critical to a satisfactory performance of the cleaner.

When properly diluted the cleaning solution, on a weight basis, consists of about 0.1 to 3.0 parts of one of the aforementioned amines and preferably monoethanolamine, 0.015 to 0.25 part of sodium mercaptobenzothiazole, small but effective amounts of about 0.01 to 0.1 part nonionic wetting agent, 0 to about 0.2 part of a compound taken from the group consisting of sodium nitrilotriacetate and the tetrasodium salt of ethylenediaminetetraacetic acid, 0 to about 36 parts of methyl alcohol and 60.4 parts to 99.8 parts water. This solution when containing about 36 parts by weight of methyl alcohol has a freezing point of about $-32°$ F., which is suitable for use in an automobile windshield washer in the coldest inhabited geographical areas.

A preferred composition consists, on a weight basis, of about 0.3 to 1 part of one or more of the aforementioned amines and preferably monoethanolamine, at least about 0.03 but preferably to about 0.1 part sodium mercaptobenzothiazole, about 0.015 to 0.03 part nonionic wetting agent, 0 to about 0.1 part of a compound taken from the class consisting of trisodium nitrilotriacetate and the tetrasodium salt of ethylenediaminetetraacetic acid, 0 to about 22 parts methyl alcohol and 76.8 to 99.7 parts water. When the alcohol is present to the extent of about 22 parts, the solution has a freezing point of about $0°$ F.

Each of the ingredients in the cleaning solution has an essential function and, as will appear hereinafter, some of the ingredients contribute to at least one other function.

The amine is a compound selected from the class consisting of monoethanolamine, diethanolamine, diethylenetriamine, ethylenediamino and isobutylamine. These amines have been found to have no appreciable adverse effect of the glass; they form satisfactory solutions with alcohol and water solutions of the type involved in the invention, and are not significantly volatile so as to be lost from the automobile washer reservoir by evaporation under the normal climatic or operating conditions. The amines form basic solutions in water and when present in the concentrations as stated above, the solutions have pH values of the order of about 11 to 12. Amines which are effective cleaners other than those mentioned above have been found to be too volatile to remain in the reservoir solutions or have such low volatility that they tend to remain as a persistent residue on the windshield outside the wiper blade area even at surface temperatures as high as $135°$ F. As previously indicated, monoethanolamine is the preferred amine component. The hydroxide ions as well as the amine and the 2-hydroxyethylammonium ions are highly surface-active and have a very strong affinity for glass. The hydroxide ions also have a tendency to hydrolyze esters such as dibutyl phthalate and thus to facilitate the removal of such materials from the glass surfaces. The 2-hydroxyethylammonium ions are strongly attracted to the oxygen atoms of the silica network, and the affinity of the hydroxide ions and the unshared electron pair on the nitrogen atoms of the free amine for the electrophilic sites in the glass results in the tendency for the amine to be strongly chemisorbed on the glass surface, with the result that effective cleaning action takes place.

The function of the sodium mercaptobenzothiazole is to protect metal parts that may come in direct contact with the washer fluid. It functions as an effective corrosion inhibitor for metals and alloys and particularly copper and copper alloys such as may be encountered in the washer mechanism of the automobile. Amounts of this compound below the range stated above do not provide adequate corrosion protection to the metal parts and amounts in excess of the range are unnecessary.

The wetting agent is preferably polyethylene glycol tertdodecyl thioether which is readily soluble in water and alcohols. Other nonionic surfactants which may be used include the alkyl phenol polyglycol ethers such as nonylphenoxypoly (ethyleneoxy) ethanol, and isooctyl phenyl polyethoxy ethanol.

The tretrasodium salt of ethylenediaminetetraacetic acid serves a triple function. It serves as a water softener in that it complexes calcium and magnesium ions and thus prevents the formation of deposits in the washer reservoir which tend to clog the washer system. As is well known, precipitation of calcium carbonate is a familiar chemical phenomenon associated with the loss of carbon dioxide and the resultant conversion of bicarbonate ions to normal carbonate ions. The temperature of solutions in conventional windshield washer reservoirs typically rises sufficiently from the heat radiated by the engine to cause the carbon dioxide to be expelled readily. Since the tetrasodium ethylenediaminetetraacetate is a salt of a weak acid, it hydrolyzes in water and contributes to the alkalinity of the solution. Further, the presence of tetrasodium ethylenediaminetetraacetate in excess of that needed to provide the water-softening function is available for adsorption at active sites of divalent cations on the surface of the glass where it may assist in dispersing the low-energy contaminating film. The trisodium nitrilotriacetate serves the same function.

The antifreeze agent is preferably methanol, which is employed to lower the freezing point of the washer fluid to permit its use in the washer system under low-temperature operating conditions. While methanol is preferred because it is a more effective antifreeze liquid than, for example, isopropanol in equal concentration, the latter alcohol may be used.

Although the various ingredients involved in the cleaner solution must be present in the proportions indicated above, it is advantageous for commercial distribution of the cleaner composition to make up the ingredients consisting of the amine, the sodium mercaptobenzothiazole, the wetting agent, and the sequestering agent in the indicated proportions and to dissolve these in sufficient water to make a solution which may be readily diluted with a larger quantity of water at the time of use, to thus avoid packaging and selling unnecessary quantities of water.

The practice of the invention is further described by the following illustrations wherein the proportions of the ingredients of the washer composition are expressed on a weight basis. 0.46 part monoethanolamine, 0.01 part polyethylene glycol tertdodecyl thioether, 0.04 part tetrasodium salt of ethylenediaminetetraacetic acid, and 0.05 part sodium mercaptobenzothiazole were dissolved in 99.44 parts water to provide a solution having a consistency similar to that of water. This solution was placed in the windshield washers of three service cars. The washers of three other such cars were filled with a washer solution containing 0.1 part by weight of a wetting agent and the washers of three other cars were filled with clear tap water. All of these cars were operated under normal conditions during three summer months. During the three months of the test period, the operators of the three cars utilizing the solution of this invention observed that a sparkling clean windshield was maintained throughout the period. It was particularly noted that morning dew and the water accumulating on the windshield during light rain were readily removed without any trace of the lace-curtain effect, smearing, or any other obstruction to vision. On the other hand, the operators of the cars using the wetting agent-containing solution and the clean tap water found that their washers failed to clean the windshield without smearing and the lace-curtain effect.

Three other service automobiles equipped with a dual windshield washer system were employed in which different washer solutions could be compared on the same windshield and under identical conditions. The above washer solution of this invention was placed in one of the washers of each of these cars and the solution containing 0.1 part of a wetting agent was placed in the other. As in the previous tests it was found that that portion of the windshield which was washed with a solution of this invention maintained a sparkling, optically clean windshield under all conditions whereas the other washer produced smearing and a lace-curtain effect. In other tests using both new wiper blades and wiper blades which had been in service for about two years, similar excellent windshield cleaning results were observed using the cleaning solution of this invention. In subsequent tests 160 fleet automobiles were equipped with the above-mentioned washer solution of this invention. The operators of these cars reported the same uniform cleaning of windshields without smearing or lace-curtain effect.

Other tests were made using diethylenetriamine, ethylenediamine, isobutylamine, and diethanolamine, respectively, in the same proportions with similar results. A series of experiments was conducted in which these amines and monoethanolamine were varied in the solution in increments of about 0.2 part. These experiments established that satisfactory cleaning solutions are obtained where the amine is in a range of about 0.1 to 3 parts and optimum results were obtained in the range from 0.3 to 1 part. Other experiments were performed in which different wetting agents as above indicated were used in varied amounts. These experiments established that for effective cleaning the wetting agent should be present in proportions ranging from 0.01 to 0.1 part and preferably 0.015 to 0.03 part. In other experiments solutions were prepared in which the sodium mercaptobenzothiazole was varied in small increments. These established that the sodium mercaptobenzothiazole functions effectively as a corrosion inhibitor when present in a range of 0.015 to 0.25 part by weight and preferably from about 0.03 to 0.1 part. Other experiments established that up to 0.1 part of the tetrasodium salt of ethylene diamine tetra acetic acid or trisodium nitrilotriacetate are essential where the dilutant water is relatively hard, in the vicinity of 230 parts per million hardness. Where the water is pure or soft this component may be omitted. In general, increments of 0.04 part of the sequestering agent are added per 100 parts per million water hardness. It has been estimated that waters containing 100 parts per million water hardness serve about 62% of the car population, that waters containing up to 200 parts per million serve a total of 85%, and that waters containing up to 230 parts per million serve a total of 89% of the car population. An amount of the sequestering agent in excess of 0.2 part interferes with the proper functioning of the cleaning solution.

Further experiments established that the solutions also operate satisfactorily when the water is replaced with methyl or isopropyl alcohol up to 36 parts.

As previously indicated, the ingredients of the washing solution other than the water may be compounded as an additive for addition to water or alcohol and water in the above stated portions. These ingredients may be made up in substantially a paste form. However, for ease of solution in water they are preferably made up as a concentrate with water or with water and a suitable alcohol to provide a concentrated solution which is readily diluted with a larger quantity of water or alcohol and water. A suitable concentrated solution for this purpose may consist of between 3 to 10 parts by weight of the amine, 0.8 to 1.0 part of the sequestering agent, 0.15 to 0.3 part of the wetting agent, 0.3 to 1.0 part of the sodium mercaptobenzothiazole dissolved in 30.75 to 95.75 parts water and 0 to 65 parts methyl alcohol.

Although the invention has been described in terms of certain specific embodiments, it is to be understood that the scope is not to be limited thereby except as defined in the following claims.

I claim:

1. A windshield cleaning composition containing ingredients in the proportion of 0.1 to 3.0 parts by weight of an amine selected from the group consisting of monoethanolamine, diethanolamine, diethylenetriamine, ethylenediamine, and isobutylamine, 0.015 to 0.25 part by weight sodium mercaptobenzothiazole, small but effective amounts up to about 0.1 part by weight of a nonionic surface active agent compatible in said solution, and 0 to 0.2 part by weight of a compound taken from the group consisting of tetrasodium salt of ethylenediaminetetraacetic acid and trisodium nitrilotriacetate.

2. A windshield cleaning composition containing ingredients in the proportion of 0.3 to 1.0 part by weight of an amine selected from the group consisting of monoethanolamine, diethanolamine, diethylenetriamine, ethylenediamine, and isobutylamine, 0.03 to 1.0 part by weight sodium mercaptobenzothiazole, small but effective amounts up to about 0.03 part by weight of a nonionic surface active agent compatible in said solution, and 0 to 0.1 part by weight of a compound taken from the group consisting of the tetrasodium salt of ethylenediaminetetraacetic acid and trisodium nitrilotriacetate.

3. A windshield cleaning fluid containing ingredients in the proportions of 0.1 to 3.0 parts by weight of an amine selected from the group consisting of monoethanolamine, diethanolamine, diethylenetriamine, ethylenediamine, and isobutylamine, 0.015 to 0.25 part by weight sodium mercaptobenzothiazole, small but effective amounts up to about 0.1 part by weight of a nonionic surface active agent compatible in said solution and 0 to 0.1 part by weight of a compound selected from the group consisting of tetrasodium salt of ethylenediaminetetraacetic acid and trisodium nitrilotriacetate, and at least a sufficient amount of water to effect an aqueous solution.

4. An aqueous windshield cleaning solution containing ingredients in the proportions of 0.3 to 1.0 part by weight of an amine selected from the group consisting of monoethanolamine, diethanolamine, diethylenetriamine, ethylenediamine, and isobutylamine, 0.03 to 1.0 part by weight sodium mercaptobenzothiazole, small but effective amounts up to about 0.03 part by weight of a nonionic surface active agent compatible in said solution, and 0 to 0.1 part by weight of a compound taken from the group consisting of the tetrasodium salt of ethylenediaminetetraacetic acid and trisodium nitrilotriacetate.

5. A windshield cleaning solution consisting essentially on a weight basis of about 0.1 to 3.0 parts of an amine selected from the group consisting of monoethanolamine, diethanolamine, diethylenetriamine, ethylenediamine, and isobutylamine, 0.015 to 0.25 part by weight of sodium mercaptobenzothiazole, small but effective amounts up to about 0.1 part by weight of a nonionic surface active agent compatible in said solution, 0 to about 0.1 part by weight of a compound taken from the group consisting of tetrasodium salt of ethylenediaminetetraacetic acid and trisodium nitrilotriacetate, 0 to about 36 parts of an alcohol taken from the group consisting of methyl alcohol and isopropyl alcohol and about 99.8 to 60.5 parts by weight water.

6. The solution of claim 5 wherein said amine is monoethanolamine and said compound is the tetrasodium salt of ethylenediaminetetraacetic acid.

7. A windshield cleaning solution consisting essentially on a weight basis of about 0.3 to 1.0 part of an amine selected from the group consisting of monoethanolamine, diethanolamine, diethylenetriamine, ethylenedimine, and isobutylamine, 0.03 to 0.1 part by weight of sodium mercaptobenzothiazole, small but effective amounts up to about 0.03 part by weight of a nonionic surface active agent compatible in said solution, 0 to about 0.1 part by weight of a compound selected from the group consisting of tetrasodium salt of ethylenediaminetetraacetic acid and trisodium nitrilotriacetate, 0 to about 22 parts of an alcohol taken from the group consisting of methyl alcohol and isopropyl alcohol and about 76.8 to 99.7 parts by weight water.

8. The solution of claim 7 wherein said amine is monoethanolamine and said compound is the tetrasodium salt of ethylenediaminetetraacetic acid.

9. A windshield cleaning solution for addition to additional water or a water-alcohol solution consisting essentially on a weight basis of 0.3 to 1.0 part of an amine selected from the group consisting of monoethanolamine, diethanolamine, diethylenetriamine, ethylenediamine, and isobutylamine, 0.03 to 0.1 part by weight sodium mercaptobenzothiazole, small but effective amounts up to about 0.03 part nonionic surface active agent compatible in said solution, 0.015 to 0.03 part of a compound selected from the group consisting of tetrasodium salt of ethylenediaminetetraacetic acid and trisodium nitrilotriacetate, 53.8 to 99 parts water and 0 to 45 parts of an alcohol taken from the group consisting of methyl alcohol and isopropyl alcohol.

References Cited by the Examiner
FOREIGN PATENTS 651,184 10/1962 Canada.
773,857 5/1957 Great Britain.

LEON D. ROSDOL, *Primary Examiner.*

SAMUEL H. BLECH, *Examiner.*

S. E. DALDEN, *Assistant Examiner.*